(12) United States Patent
Heise et al.

(10) Patent No.: US 8,304,745 B2
(45) Date of Patent: Nov. 6, 2012

(54) SPECIMEN HOLDER HAVING ALIGNMENT MARKS

(75) Inventors: Heino Heise, Adelebsen (DE); Andreas Nolte, Rosdorf/Mengershausen (DE); Christian Thomas, Ellwangen (DE); Martin Edelmann, Aalen (DE); Uwe Wolf, Magdala (DE); Ulrich Kohlhaas, Göttingen (DE); Dmitry Lysenkov, Oberkochen (DE)

(73) Assignees: Carl Zeiss MicroImaging GmbH, Jena (DE); Carl Zeiss AG, Oberkochen (DE); Carl Zeiss NTS GmbH, Oberkochen (DE)

( * ) Notice: Subject to any disclaimer, the term of this patent is extended or adjusted under 35 U.S.C. 154(b) by 24 days.

(21) Appl. No.: 13/149,285

(22) Filed: May 31, 2011

(65) Prior Publication Data

US 2012/0126115 A1  May 24, 2012

(30) Foreign Application Priority Data

Nov. 24, 2010  (DE) .......................... 10 2010 052 674

(51) Int. Cl.
*G02B 21/34* (2006.01)
*H01J 37/20* (2006.01)
*H01J 37/26* (2006.01)

(52) U.S. Cl. ......... 250/442.11; 250/440.11; 250/441.11; 250/492.1

(58) Field of Classification Search ............. 250/440.11, 250/441.11, 442.11
See application file for complete search history.

(56) References Cited

U.S. PATENT DOCUMENTS

| | | | | |
|---|---|---|---|---|
| 5,905,266 | A * | 5/1999 | Larduinat et al. | 250/492.21 |
| 6,002,136 | A * | 12/1999 | Naeem | 250/442.11 |
| 6,683,316 | B2 * | 1/2004 | Schamber et al. | 250/492.1 |
| 6,717,159 | B2 * | 4/2004 | Novak | 250/492.2 |
| 7,245,133 | B2 * | 7/2007 | Tsao et al. | 324/750.14 |
| 2008/0030873 | A1 | 2/2008 | Matsui et al. | |
| 2012/0126115 | A1* | 5/2012 | Heise et al. | 250/307 |
| 2012/0133757 | A1* | 5/2012 | Thomas et al. | 348/80 |

FOREIGN PATENT DOCUMENTS

DE  10 2009 020 663 A1  11/2010

* cited by examiner

*Primary Examiner* — David A Vanore
(74) *Attorney, Agent, or Firm* — Walter Ottesen

(57) ABSTRACT

For the microscopy of an object or a specimen with a combination of optical microscopy and particle beam microscopy, an electrically conducting specimen carrier (1) is used which is configured for use in a particle beam microscope as well as in an optical microscope and has at least one alignment mark (2). The alignment mark is configured as a pass-through structure and is detectable from the top and from the bottom of the specimen carrier.

16 Claims, 2 Drawing Sheets

SPECIMEN HOLDER HAVING ALIGNMENT MARKS

CROSS REFERENCE TO RELATED APPLICATION

This application claims priority of German patent application no. 10 2010 052 674.6, filed Nov. 24, 2010, the entire content of which is incorporated herein by reference.

FIELD OF THE INVENTION

The invention relates to the microscopy of an object with a combination of optical microscopy and particle beam microscopy.

BACKGROUND OF THE INVENTION

An examination with optical microscopy, for example, with light microscopy as well as with particle beam microscopy, for example, with electron microscopy, is often desirable, in particular for biological or material-science specimens. In the state of the art, complex microscopes which can carry out both types of microscopy methods are used. Such a microscope is known, for example, from EP 0849765 A2 or the U.S. Pat. No. 6,683,316 B2. Such combination microscopes are especially complex because the optical microscope must be completely incorporated in the vacuum chamber which is required for the particle beam microscope, and a specimen stage must be provided which moves the specimen between the two microscopes in the vacuum. The result is a relatively large vacuum volume and, moreover, considerable complexity in the production of the optical microscope which must be manufactured in a vacuum-compatible construction. A further disadvantage is that an optical imaging with immersion is not possible in the vacuum. If one forgoes the arrangement of the object in the vacuum in particle beam microscopy, as for example in the combination microscope according to United States patent application publication 2008/0030873 A1, the image quality will suffer because the electrons are scattered by a membrane as well as by the air.

An alternative to the use of such combination microscopes is the sequential use of individual devices. In the state of the art, various, incompatible bracket concepts are used for this purpose. For optical microscopy, glass slides are typically used with cover glasses which are several centimeters in size and are placed over the specimen. In electronic microscopy, nets which are several millimeters in size or metallic specimen trays are commonly used. In order to transport an object to be examined microscopically, for example, a biological specimen, from the optical microscope to the particle beam microscope, the specimen must be transferred from one support system to the other. This entails several disadvantages. First, the transfer is time-consuming and involves the danger of that the specimen will be damaged or destroyed. Further, the position referencing in both microscopy methods is difficult because the position of a region examined, for example, with optical microscopy must first be re-located for the particle beam microscopy. Even the use of markers in the object or on the biological specimen does not help here, because the specimen structure generally changes during transfer, for example, resulting from strain. A time-consuming and tedious relocating of the region previously examined with the other microscopy procedure is thus unavoidable. Even the finder grids known from transmission electron microscopy, that is round specimen nets whose net grid quadrants are marked, for example, numbered, do not solve this problem, because it is practically impossible to transfer a finder grid between two microscope platforms in the exact orientation. The position-precise recognition of a particular specimen region on the finder grid with a second microscope platform is thus hardly possible.

From DE 10 2009 020663, the content of which is incorporated by reference, a specimen slide system is known with which the objects can be microscopically examined one after the other with optical microscopy and particle beam microscopy. The system includes a holder having a window which is configured to be placed in a particle beam microscope as well as an optical microscope and a specimen slide element which can be placed over the window of the holder, whereby the specimen holder element can be fixed over the window. For the position-precise detection of a particular specimen region during the sequential implementation of different microscopy platforms alignment marks are suggested which make it possible to bring a particular object region into a desired position in each microscope, in that calibration of the object region in relation to the position of the holder is effected by the alignment marks.

In DE 10 2009 020663, the alignment marks are arranged as structures on the non-transparent holder, which fact has the disadvantage that the holder surface must be manufactured with a low surface roughness which makes the surface very scratch-sensitive. As a result of the scratch sensitivity, the holder may quickly become unusable if the mark gets damaged. Furthermore, an applied mark is very low-contrast under a stereo microscope, which fact makes the automatic calibration almost impossible. The risk of soiling is very high with applied marks. Such fine structures cannot be cleaned in an ultrasonic bath either, which makes it very difficult to automatically calibrate the mark, in particular, in the electron microscope. All these problems in connection with applied marks make the re-use of the holder almost impossible in different microscopy methods and specimens. A further disadvantage is that when the alignment marks are arranged on the non-transparent holder as structures, the position of the mark can only be seen from one side of the holder. A precise position determination from both the top and the bottom of the holder is, however, important if both microscopy methods access the specimen from different sides and the same specimen region is supposed to be detected at a precise position.

SUMMARY OF THE INVENTION

It is an object of the invention to provide a specimen carrier whose alignment marks overcome the disadvantages described above.

According to the invention, the object is achieved by a specimen carrier for the microscopy of an object with a combination of optical microscopy and particle beam microscopy, wherein the specimen carrier has at least one alignment mark which is configured as a pass-through structure and thus is detectable from both sides of the specimen carrier.

According to the invention, a method for microscopy of an object is also provided. The object is examined with an optical microscope and, before or after, with a particle beam microscope and wherein a specimen carrier as described above is used. The object is applied onto the specimen carrier, and the specimen carrier is then used consecutively in both microscopy methods, that is, the optical microscope and the particle beam microscope, so that the object is examined consecutively by both microscopes.

The specimen carrier according to the invention is suitable for optical microscopy as well as particle beam microscopy. In the context of this description, the term optical microscopy refers to every microscopy method which, for imaging, uses radiation adhering to the laws of optics, in particular the visible spectrum, that is, light. In the context of this disclosure, the term particle beam microscopy is given when imaging occurs via a beam of charged particles, for example, in the form of electron beam microscopy. As far as the disclosure discusses light microscopy or electron beam microscopy, these are mentioned only as examples of optical microscopy and particle beam microscopy, respectively.

The suitability for the particle beam microscopy requires that the specimen carrier is electrically conductive and preferably is not magnetizable or only magnetizable to a tolerable, predetermined limit. The specimen, that is the object to be examined by microscopy, is held or supported on the specimen carrier. Preferably, an object carrier element, for example, a typical cover glass or alternatively a conducting net, can be placed over a window which is preferably formed in the specimen carrier. The object carrier element carries the object, that is, the specimen, and can preferably be fixed with a fixation element over the window. By this fixation, the object is fixed on the specimen carrier and can be examined with optical microscopy as well as particle beam microscopy, without requiring to be transferred to other carriers. Preferably, the object carrier element is clamped in the holder by means of a spring. The specimen carrier is hereby preferably configured in such a way that a matching cut-out is provided at the top for the object carrier element. The specimen carrier can be inserted into the cut-out and subsequently be clampingly fixed by the spring, whereby the window is arranged centrally below the cut-out for the object carrier element. Any resilient material is suitable as spring material, as long as it is electrically conductive and preferably not magnetizable or only magnetizable within tolerable, predetermined limits.

In order to ensure the compatibility of the specimen carrier with the alternative microscopy platforms, adapters are provided in one embodiment which ensure a secure placement of the specimen carrier in the alternative microscopy platforms. The adapter can have a mounting arrangement for mounting the adapter on a receiving arrangement of the particle beam microscope and a support surface having a holding arrangement for fixing the specimen carrier on the support surface. Preferably, this adapter has a cut-out for insertion of a particle beam detector below the support surface and above the mounting arrangement, since then a measurement in transmission operation is then possible. However, the specimen carrier can also be configured appropriately for alternative microscopy platforms.

As long as there is a window provided in the specimen carrier, the specimen or object which is disposed on the object carrier element fixed on the specimen carrier is optically accessible from the top as well as from the bottom. This enables not only reflected light microscopy but also transmitted light microscopy as long as the object carrier element is correspondingly transparent. The same is valid for particle beam microscopy.

Via the alignment mark(s) a mechanism of the microscope for moving the specimen carrier, for example, a specimen table can be calibrated with regard to the position of the specimen carrier in the optical microscope as well as the particle beam microscope. For this purpose, the alignment mark(s) are approached, and the corresponding position of the mechanism, for example, the specimen table, is read out. This can be done by the user as well as automatically by using corresponding control elements. By means of the alignment mark(s) a position indication for the specimen carrier is defined; when using three alignment marks, a coordinate system can be determined. Thus, the position of the specimen carrier for each object region of interest can be stored simply in relation to the alignment mark(s). After the transfer of the holder to the second microscope, for example, the particle beam microscope, a calibration is initially performed via the alignment mark(s), in that by actuation of the mechanism, for example, the specimen carrier, the mark(s) is/are imaged and this is linked to the corresponding position of the mechanism, for example, the specimen table. Thus, previously stored object regions can be approached by simply actuating the mechanism. The user does not have to concern himself/herself with finding previously defined object regions anew in the second microscope.

The alignment marks are preferably chosen as L-shaped marks because these typically do not occur in natural surface structures and thus have a high chance of being recognized. Further, the mark orientation is clearly identified by the L-structure. However, every other structure is also possible. The mark is preferably provided as a double mark, with the one mark preferably being a larger reiteration of the smaller mark. Thus, a simpler retrievability of the alignment mark is ensured. The fine calibration of the microscope mechanism is preferably achieved via the smaller one of the two mark structures. The clear width of the smaller pass-through structure is preferably between 0.5 μm and 50 μm, preferably between 2 μm and 20 μm wide.

The alignment mark(s) can be configured as pass-through structures through the specimen carrier. In a preferred embodiment, the alignment marks are incorporated as pass-through structures in a marker foil. The foil is then firmly fixed to the specimen carrier. This entails that openings are provided in the specimen carrier where the marker foil(s) is connected to the specimen carrier, via which the alignment mark(s) is/are placed so that according to the invention these are detectable from both the top side as well as the bottom of the specimen carrier.

So that the alignment marking can also be imaged in the electron microscope, the foil is produced from a material which conducts well and preferably is not magnetizable or only magnetizable within tolerable, predetermined limits. A suitable material for this, for example, is bronze. In addition, it is especially preferable that the foil material is chemically inert. A material fulfilling all of these prerequisites is, for example, titanium.

Foils of different thicknesses are suitable as foil material. In order to ensure the required stability of the foil, foil thicknesses of between 1000 μm and 10 μm and in particular preferably thicknesses between 200 μm and 20 μm are used.

The mark is preferably incorporated in the marker foil by means of laser engraving. So that the mark distinguishes itself better from the foil structure, the mark is preferably incorporated off-set by an angle to the rolling structure of the foil, in particular, preferably at an angle of approximately 45° to the rolling structure. The marker foil is preferably formed at right angles. As far as L-shaped marks are chosen, the sides of the L-structures are preferably aligned so that they are oriented in parallel or perpendicularly to the sides of the marker foil.

In a preferred embodiment, the specimen carrier has cut-out(s) for receiving the marker foil. In a further preferred embodiment, each cut-out has at least two adjacent walls which are perpendicular to each other and on which the likewise right-angled marker foil formed can be placed. By placing the marker foil on the side walls of the cut-outs, a well-defined alignment of the L-structure in relation to the object holder can be achieved. This vastly simplifies the automatic finding of this structure via an algorithm.

In a further preferred embodiment, the marker foil(s) are fixed on the specimen carrier via an adhesive bond. For the use in an electron microscope, an electrical connection between the specimen carrier and the marker foil is important so that the electrons can be diverted and the specimen is not electrically charged. For this reason, the adhesive bond is preferably done with an electrically conducting adhesive. Because the adhesive must not outgas in the high vacuum of the electron microscope, adhesives of low outgassing are preferably used. Alternatively, the connection between the marker foil and the specimen carrier can also be produced by fusing the two components. The fused connection is preferably achieved by laser welding, in particular laser spot welding. In this connection, the marker foil can be precisely aligned on the support surfaces of the holder and be fixed and be electrically connected to the holder without the influence of force.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
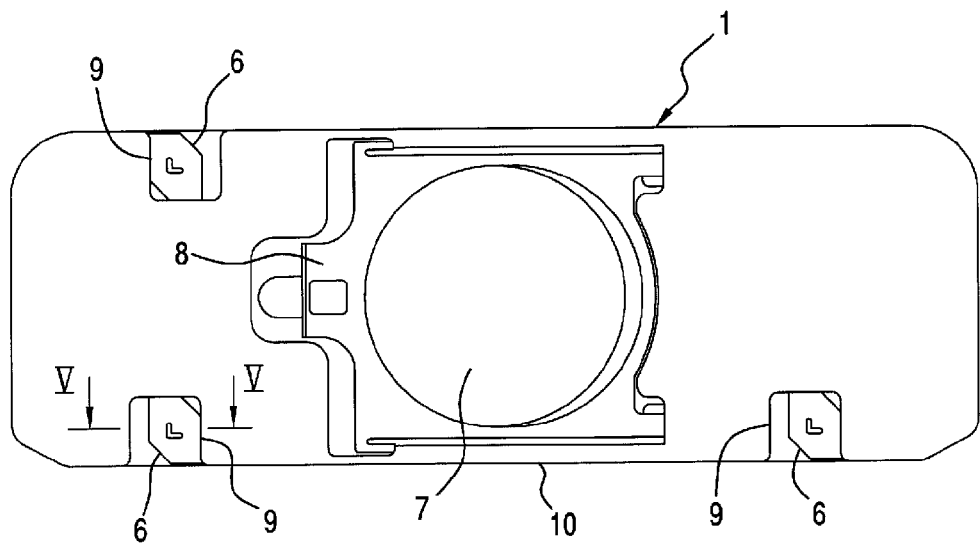
FIG. 1 shows a top plan view of a first embodiment of a specimen carrier according to the invention.

FIG. 1 shows the top of a specimen carrier 1 by means of which an object, for example, a biological specimen, can be examined with a combination of light microscopy and electron beam microscopy. The specimen carrier 1 is configured as a metallic holder 10 which has the outer dimensions of a standard glass object carrier. It is, for example, 75.5 mm long and 25.5 mm wide. Such dimensions allow an especially simple use of the specimen carrier 1 in a conventional light microscope. Where applicable, other dimensions for the specimen carrier 1 are of course also possible and advantageous, depending on the application.

The specimen carrier 1 has a window 7 configured as a complete aperture through the plate-shaped specimen carrier 1 in a central region in which typically a glass object carrier would be used. A typical cover glass which is fixed over the window 7 with a spring 8 is used as the object carrier element.

The specimen carrier 1 further has three equivalent recesses 9 having walls which are at right angles to each other. A marker foil 6 is inserted into each recess 9 in a manner plane-parallel to the walls of the recesses 9 and is connected to the specimen carrier 1. Because of the arrangement of the foils in the recesses, they are protected against mechanical external influences and thus are less susceptible to scratches which can quickly make the specimen carrier 1 unusable when they damage the alignment marks 2.

Figure 5:
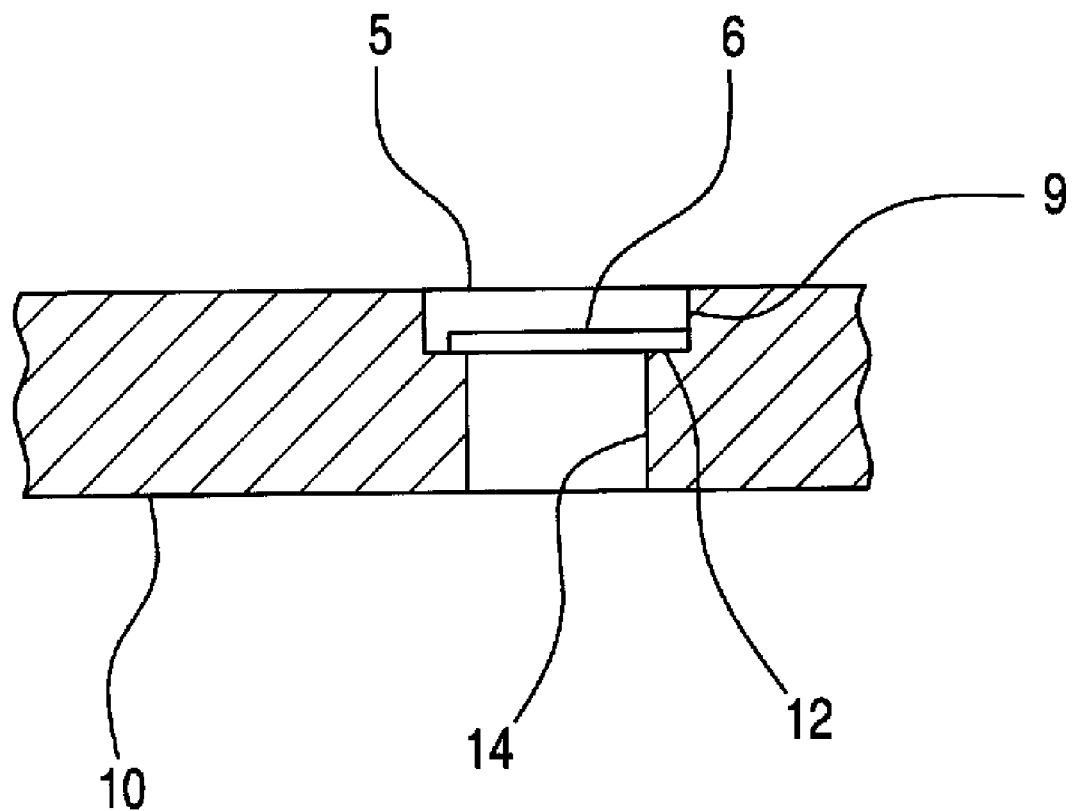

This can best be seen in FIG. 5 which shows a detail section view of the holder 10 through one of the openings 5 thereof. At the upper end of the opening 5, a recess 9 is formed in the holder 10. A bore 14 extends from the recess 9 to the bottom side of the specimen carrier. The marker foil 6 is seated on the shoulder 12 and the marks (3, 4) formed in the marker foil 6 can be seen from both upper and lower sides of the specimen carrier.

In the recess 9, the marker foil 6 is protected against unwanted touching by personnel handling the specimen carrier.

Figure 2:
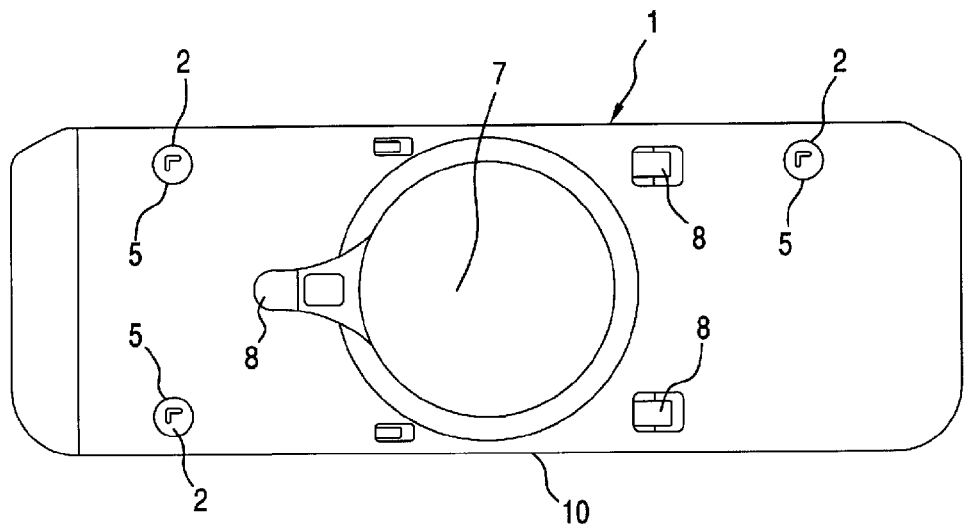
FIG. 2 shows a bottom plan view of the specimen carrier.

FIG. 2 shows the bottom of the specimen carrier. The opening 5 is configured to pass through the holder 10 of the plate-shaped specimen carrier 1 and is arranged approximately at the center of each recess 9. The alignment marks 2 of the marker foil 6 are also detectable through these openings 5 from the bottom of the specimen carrier 1.

Figures 3, 4:
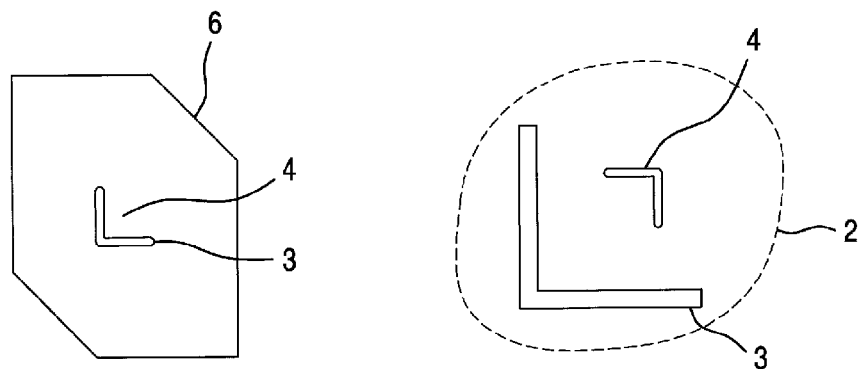
FIG. 3 shows an embodiment of a marker foil similar to the one used in the specimen carrier of FIG. 1.
FIG. 4 is an enlarged view of an alignment mark similar to the one on the marker foil of FIG. 3; and, FIG. 5 is a detail section view taken along line V-V of FIG. 1 showing an opening in the holder of the specimen carrier for accommodating a marker foil therein.

FIG. 3 shows an enlarged view of the marker foil 6 as is exemplified in the specimen carrier of FIG. 1. The alignment mark is configured as a double structure, the one mark 3 preferably being an enlarged reiteration of the smaller mark 4. The marks (3, 4) are formed as slits in the marker foil 6. Thus, easier retrievability of the alignment mark is ensured. The fine calibration of the microscope mechanism is preferably accomplished via the smaller of the two mark structures. Both marks (3, 4) are configured L-shaped. The sides of the L-structures of the marker foil 6 are aligned such that they are oriented in parallel or perpendicularly to the sides of the marker foil 6. The marks (3, 4) are configured as pass-through structures. Thus, the position of the alignment mark 2 can be seen identically from the top or bottom of the specimen carrier 1. In this manner, the marks (3, 4) can be imaged in an especially high-contrast manner in the transmitted-light mode of the light microscopy, which fact increases the precision of recognizing the markers.

FIG. 4 shows an enlarged view of an alignment mark 2, as is applied onto the marker foil 6 of FIG. 3 by way of example. The alignment mark 2 is configured as a double mark whereby the larger and the smaller of the two markings are both L-shaped.

It is understood that the foregoing description is that of the preferred embodiments of the invention and that various changes and modifications may be made thereto without departing from the spirit and scope of the invention as defined in the appended claims.

What is claimed is:

1. A specimen carrier for carrying an object for examination in an optical microscope, particle beam microscope and a combined optical and particle beam microscope, the specimen carrier comprising:

an electrically-conductive holder having an upper side and a lower side;

an alignment mark arranged on said holder; and, said alignment mark being configured as a pass-through structure detectible from said upper side and said lower side.

2. The specimen carrier of claim 1, wherein said specimen carrier comprises three of said alignment marks which conjointly define a coordinate system for said specimen carrier.

3. The specimen carrier of claim 2, wherein each of said alignment marks is configured as a double mark adapted to two different microscopy magnification levels.

4. The specimen carrier of claim 1, wherein said alignment mark is L-shaped.

5. A specimen carrier for carrying an object for examination in an optical microscope, particle beam microscope and a combined optical and particle beam microscope, the specimen carrier comprising:

an electrically-conductive holder having an upper side and a lower side;

a plurality of alignment marks arranged in said holder;

a plurality of through openings formed on said holder for accommodating respective ones of said alignment marks; and, each of said alignment marks being configured as a pass-through structure defined by an electrically-conductive marker foil and being seated in a corresponding one of said openings so as to be detectible from said upper side and said lower side.

6. The specimen carrier of claim 5, wherein said holder has a plurality of recesses formed therein at corresponding ones of said through openings for positioning the corresponding marker foil on said holder.

7. The specimen carrier of claim 6, wherein the pass through in each of said marker foils is formed by a laser engraving.

8. The specimen carrier of claim 7, wherein each of said marker foils is bonded to said holder with an electrically-conductive adhesive.

9. The specimen carrier of claim 7, wherein each of said marker foils is welded to said holder.

10. A method of microscopically examining an object arranged on a specimen carrier which includes an electrically-conductive holder having an upper side and a lower side; an alignment mark arranged on said holder; and, said alignment mark being configured as a pass-through structure detectible from said upper side and said lower side, the method comprising the steps of:
  placing the specimen carrier having said object arranged thereon in one of said microscopes;
  examining an object with said one microscope;
  placing the specimen carrier having said object arranged thereon in an other one of said microscopes; and,
  examining said object with said other one of said microscopes.

11. A specimen carrier for carrying an object for examination in an optical microscope, particle beam microscope and a combined optical and particle beam microscope, the specimen carrier comprising:
  an electrically-conductive holder having an upper side and a lower side;
  a clear-through opening formed in said holder;
  a marker foil seated in said opening in spaced relationship to both said upper side and said lower side thereby protecting said foil against damage from personnel handling the specimen carrier; and,
  an alignment mark cut into said marker foil so as to be detectible from said upper side and from said lower side.

12. The specimen carrier of claim 11, wherein said alignment mark is configured as a double mark adapted to two different microscopy magnification levels.

13. The specimen carrier of claim 11, wherein said alignment mark is L-shaped.

14. The specimen carrier of claim 11, wherein said alignment mark is formed by a laser engraving.

15. The specimen carrier of claim 11, wherein said marker foil is bonded to said holder with an electrically-conductive adhesive.

16. The specimen carrier of claim 11, wherein said marker foil is welded to said holder.

\* \* \* \* \*